United States Patent
Hori

(10) Patent No.: US 10,168,872 B2
(45) Date of Patent: Jan. 1, 2019

(54) METHOD AND APPARATUS FOR DISPLAYING AND SCROLLING CONTENT

(71) Applicant: SONY CORPORATION, Tokyo (JP)

(72) Inventor: Takuro Hori, Tokyo (JP)

(73) Assignee: SONY CORPORATION, Tokyo (JP)

(*) Notice: Subject to any disclaimer, the term of this patent is extended or adjusted under 35 U.S.C. 154(b) by 255 days.

(21) Appl. No.: 14/411,957

(22) PCT Filed: Sep. 3, 2013

(86) PCT No.: PCT/JP2013/005203
§ 371 (c)(1),
(2) Date: Dec. 30, 2014

(87) PCT Pub. No.: WO2014/041759
PCT Pub. Date: Mar. 20, 2014

(65) Prior Publication Data
US 2015/0160833 A1 Jun. 11, 2015

(30) Foreign Application Priority Data
Sep. 11, 2012 (JP) ................. 2012-199285

(51) Int. Cl.
G06F 3/0484 (2013.01)
G06F 1/16 (2006.01)
G06F 3/0485 (2013.01)
G06F 3/0488 (2013.01)

(52) U.S. Cl.
CPC ........ *G06F 3/04842* (2013.01); *G06F 1/1694* (2013.01); *G06F 3/0485* (2013.01); *G06F 3/04883* (2013.01)

(58) Field of Classification Search
CPC ............... G06F 3/017; G06F 3/0485; G06F 2200/1637; Y10S 345/901
See application file for complete search history.

(56) References Cited

U.S. PATENT DOCUMENTS

| | | | |
|---|---|---|---|
| 6,201,554 B1 | 3/2001 | Lands | |
| 7,165,227 B2* | 1/2007 | Ubillos | G06F 3/04847 345/661 |
| 9,317,110 B2* | 4/2016 | Lutnick | G06F 3/011 |
| 2009/0303204 A1 | 12/2009 | Nasiri et al. | |
| 2010/0214216 A1 | 8/2010 | Nasiri et al. | |
| 2010/0306648 A1* | 12/2010 | Wilairat | G06F 3/04855 715/702 |
| 2011/0025627 A1 | 2/2011 | Sakai | |

(Continued)

FOREIGN PATENT DOCUMENTS

EP  1553764 A1  7/2005

OTHER PUBLICATIONS

International Search Report and Written Opinion of the International Searching Authority dated Dec. 4, 2013, in PCT/JP2013/005203, filed Sep. 3, 2013.

(Continued)

*Primary Examiner* — Jennifer N To
*Assistant Examiner* — Eric J Yoon
(74) *Attorney, Agent, or Firm* — Chip Law Group

(57) ABSTRACT

An information processing apparatus includes processing circuitry implements a first effect in response to a user input when the apparatus is in a first posture and implements a second effect when the apparatus is in a second posture.

20 Claims, 13 Drawing Sheets

(56) References Cited

U.S. PATENT DOCUMENTS

| | | | |
|---|---|---|---|
| 2011/0074710 A1* | 3/2011 | Weeldreyer | G06F 3/0481 345/173 |
| 2011/0149138 A1* | 6/2011 | Watkins | G06F 3/0485 348/333.02 |
| 2011/0163955 A1 | 7/2011 | Nasiri et al. | |
| 2013/0067420 A1* | 3/2013 | Pittappilly | G06F 3/0236 715/863 |
| 2013/0265225 A1 | 10/2013 | Nasiri et al. | |

OTHER PUBLICATIONS

Extended European Search Report of EP Patent Application No. 13771220.4, dated Jul. 27, 2017, 06 pages.

* cited by examiner

[Fig. 1]
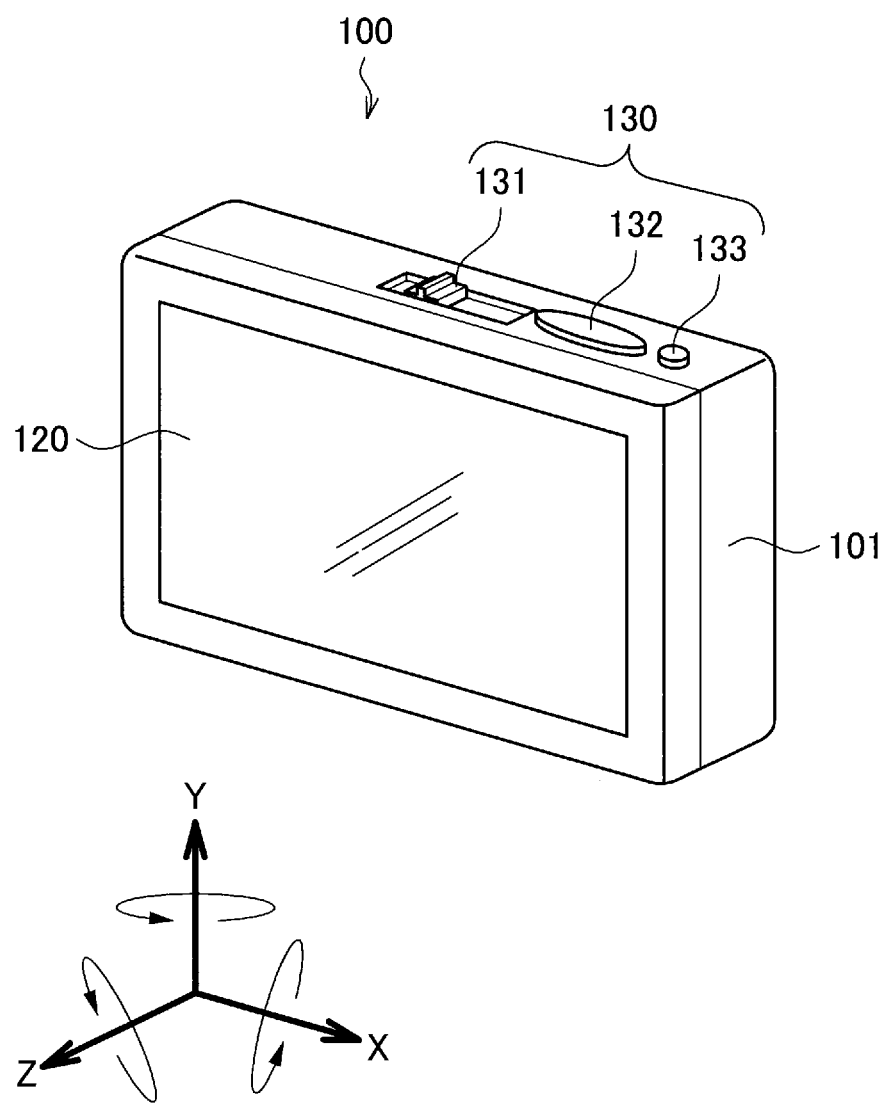

[Fig. 2]
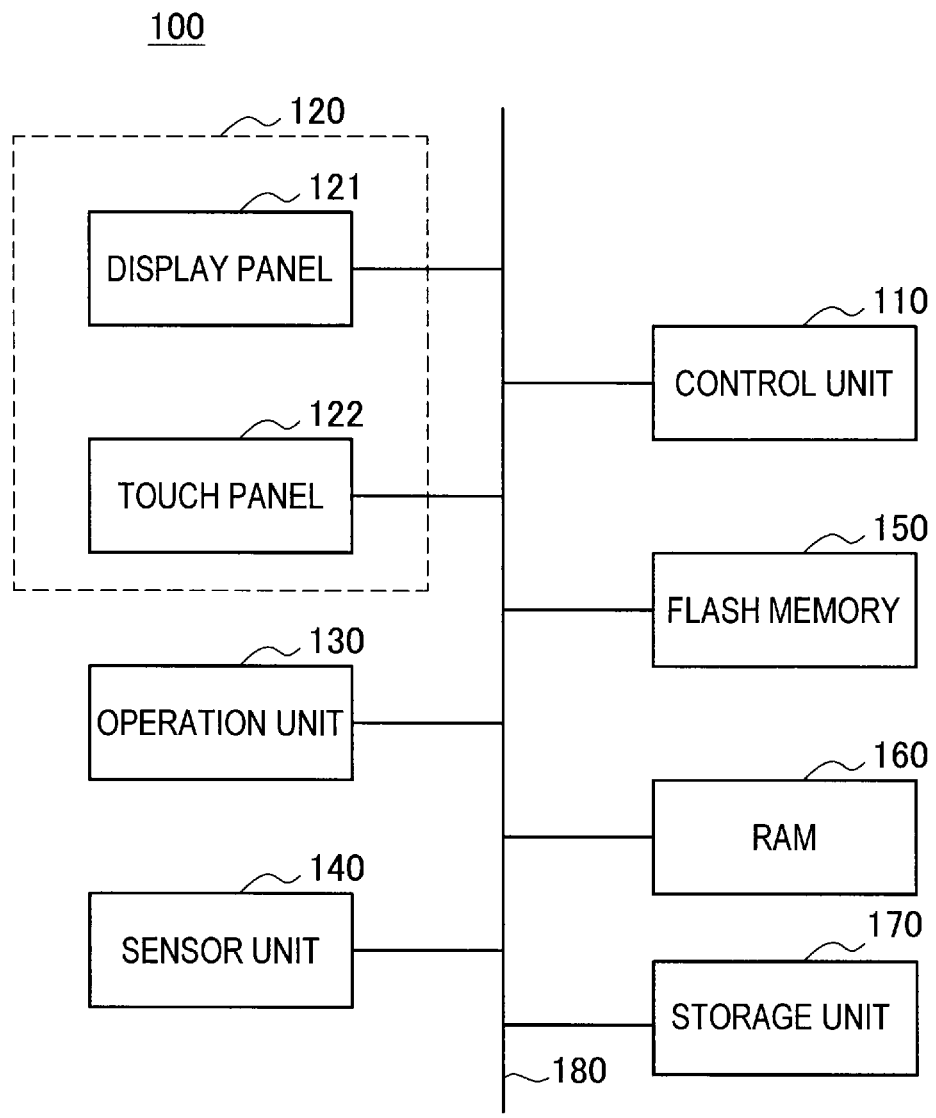

[Fig. 3]
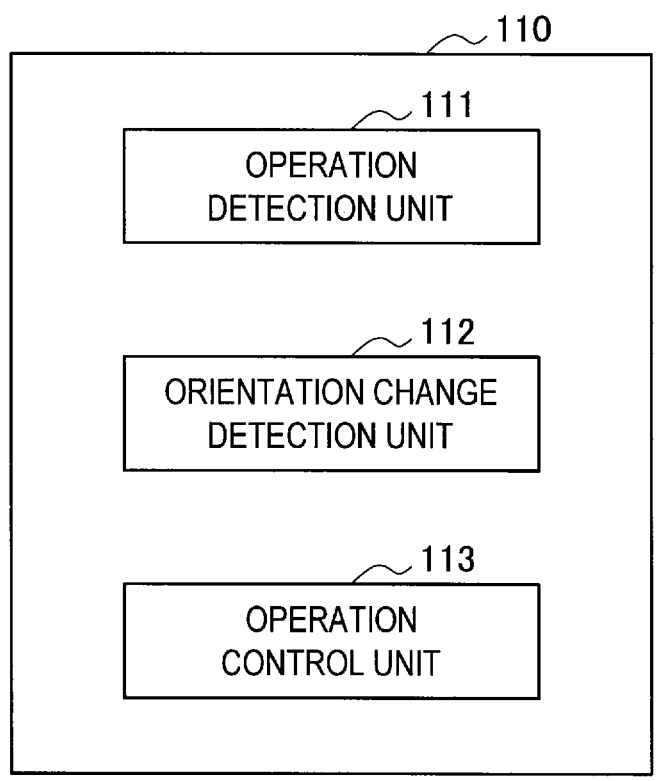

[Fig. 4A]
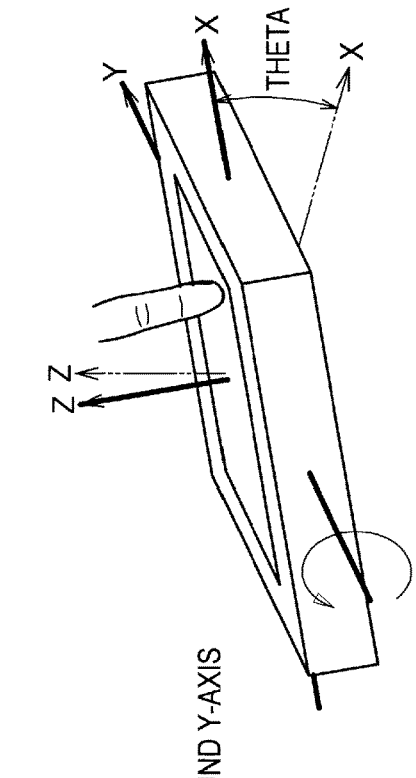
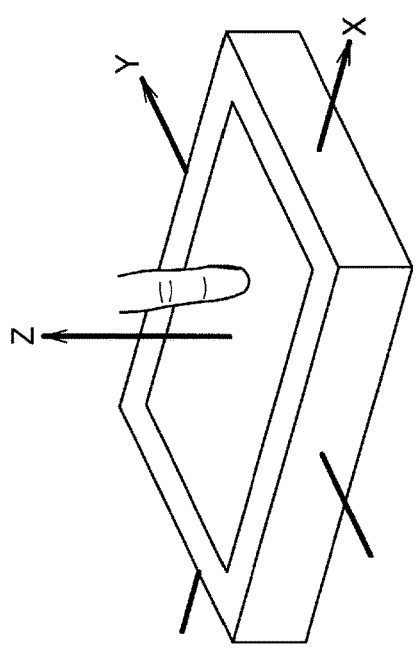

[Fig. 4B]
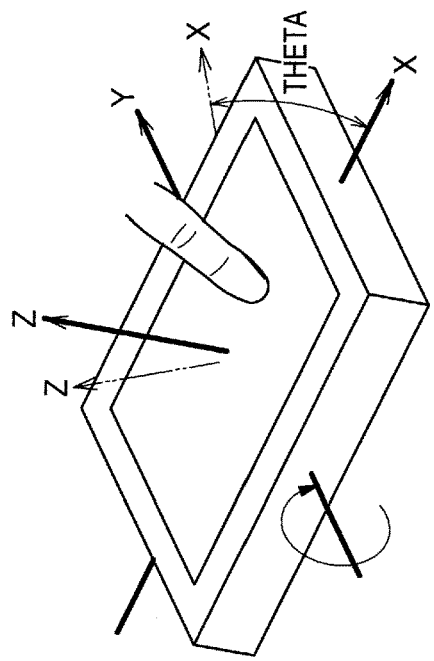
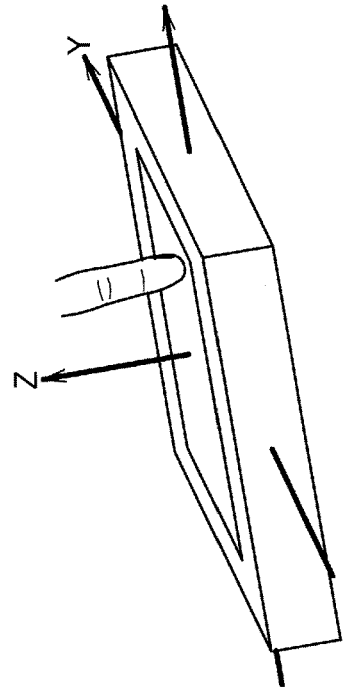

[Fig. 5]
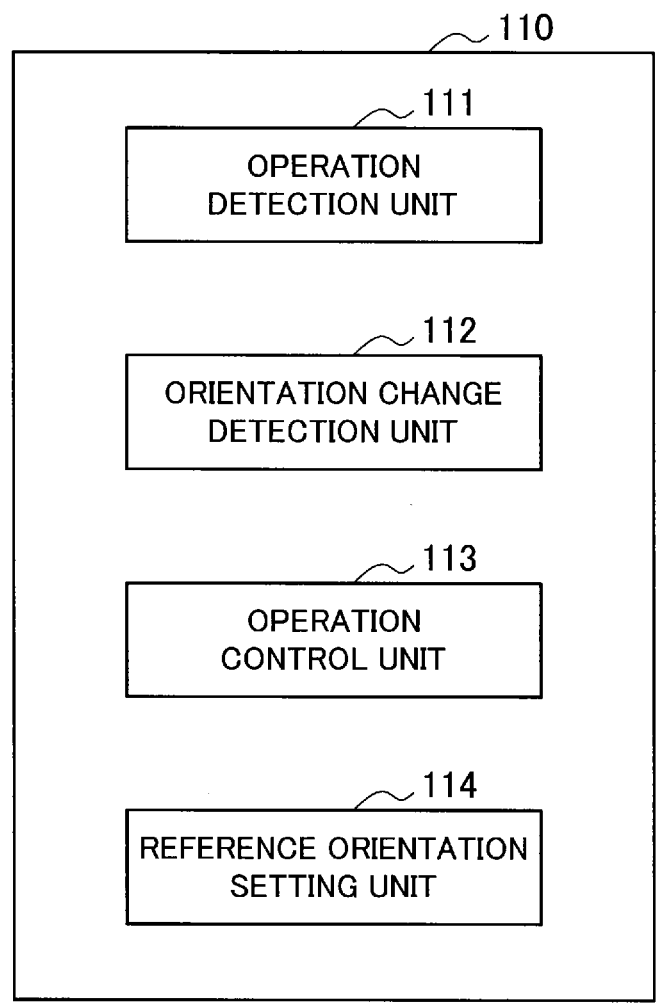

[Fig. 6]
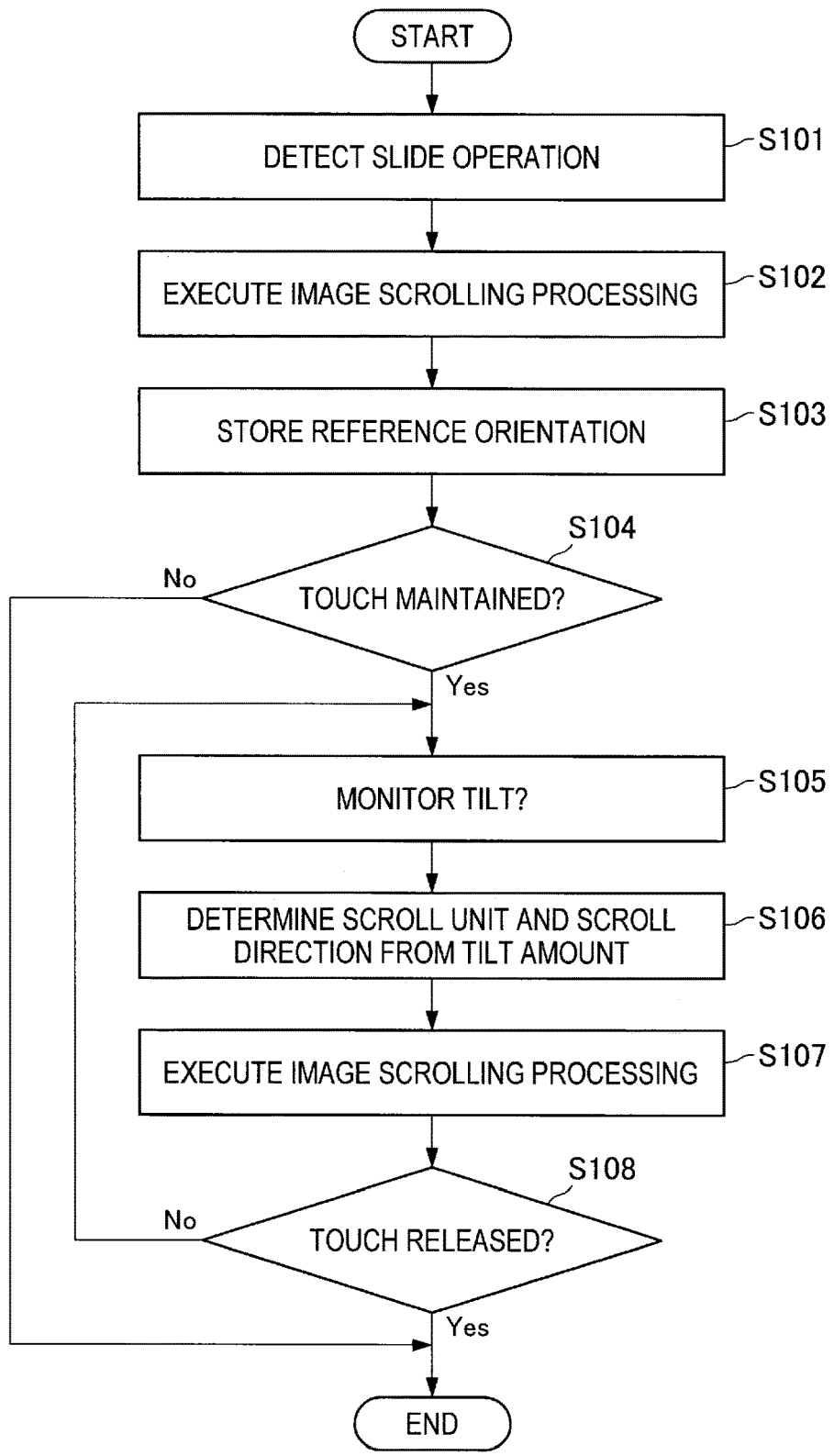

[Fig. 7]
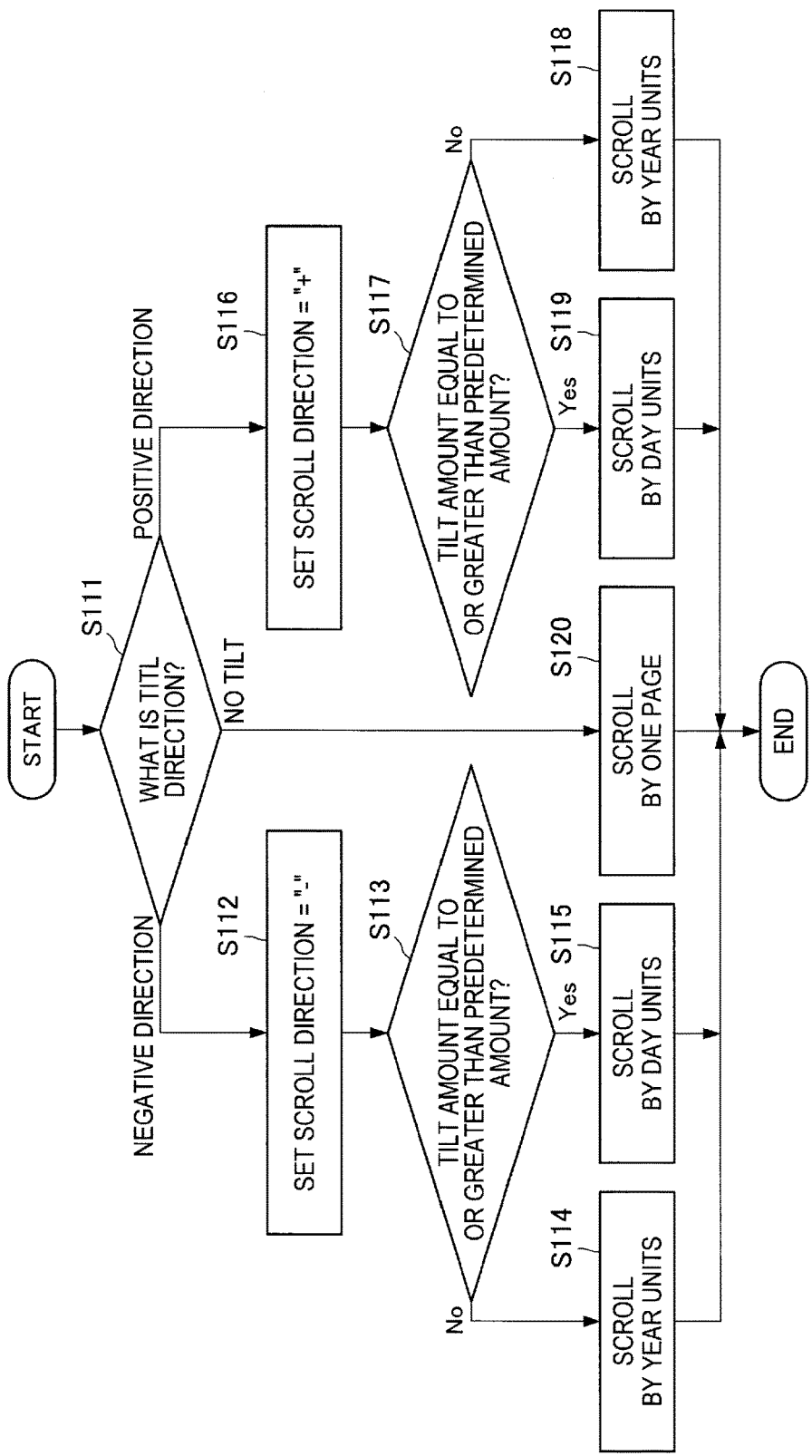

[Fig. 8]

| TILT AMOUNT | SCROLL UNIT |
|---|---|
| NO TILT | SCROLL 1 PAGE |
| SMALL TILT ↕ LARGE TILT | DAY SCROLLING WEEK SCROLLING MONTH SCROLLING YEAR SCROLLING |

[Fig. 9A]
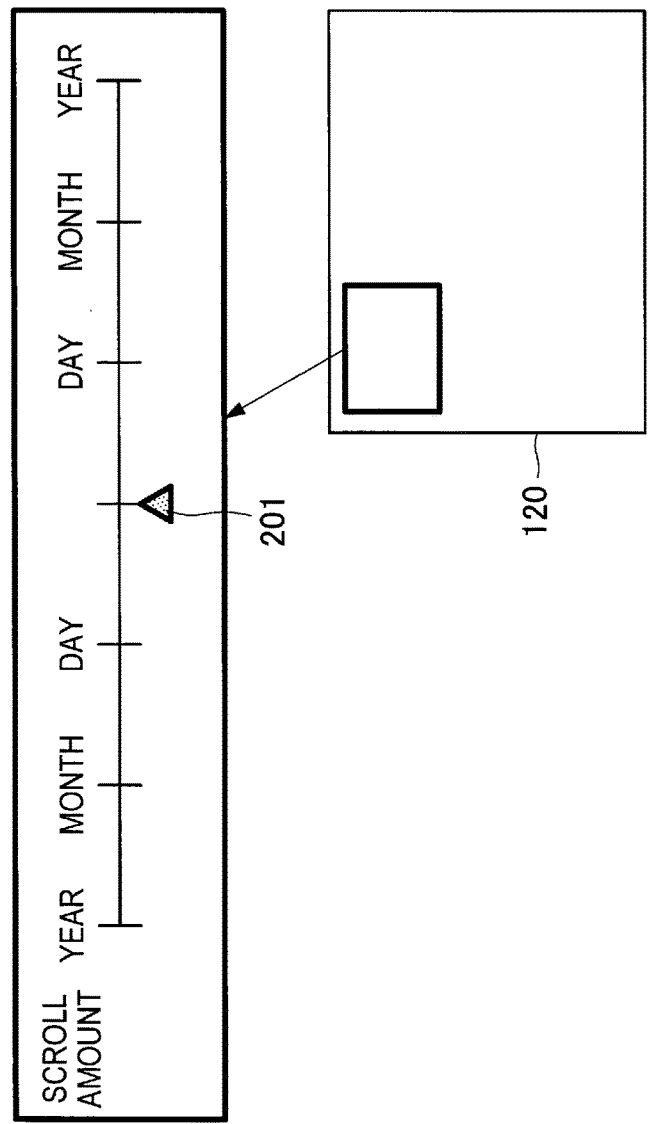
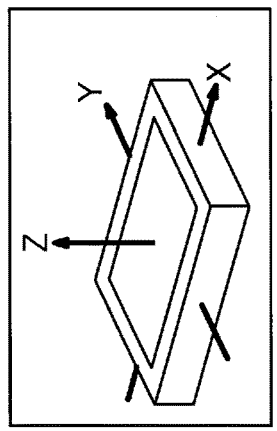

[Fig. 9B]
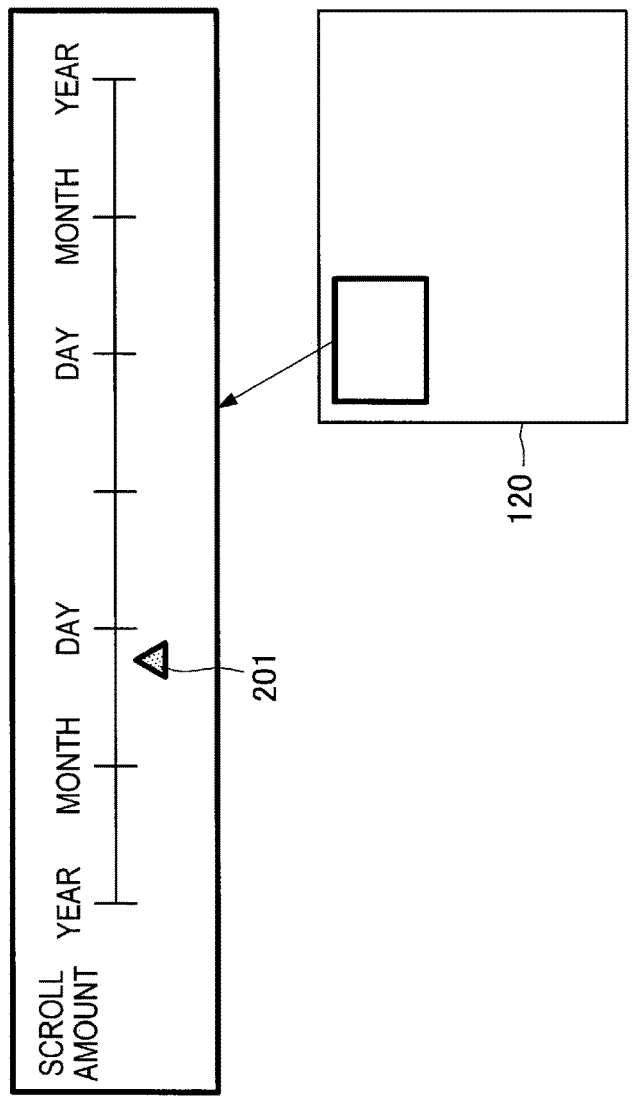
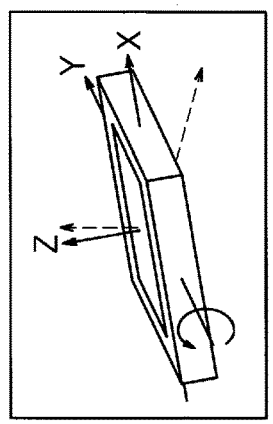

[Fig. 9C]
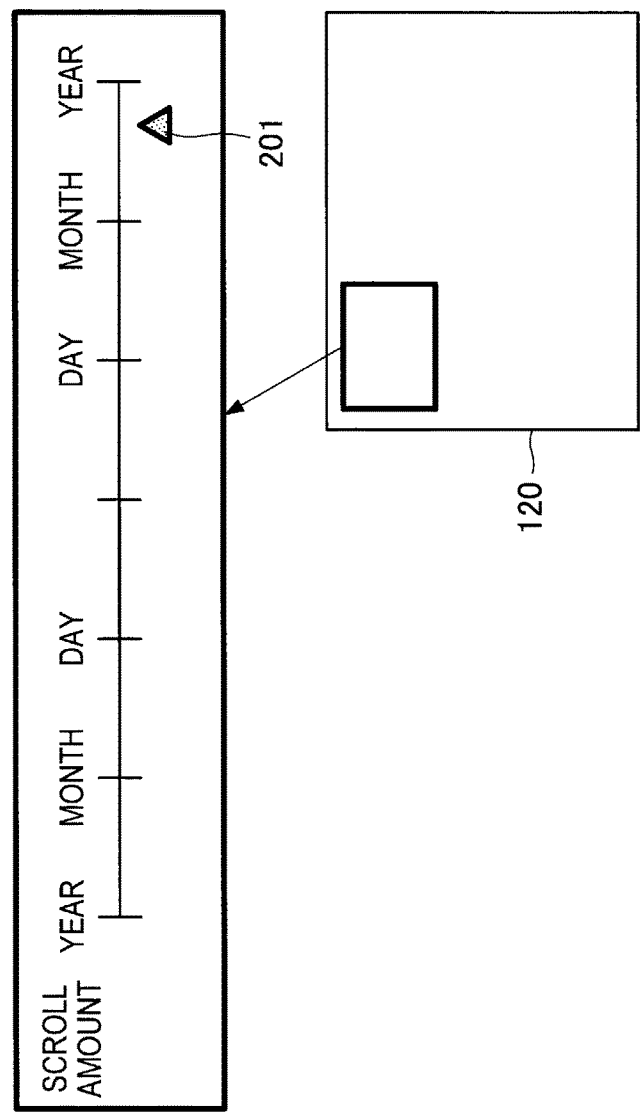
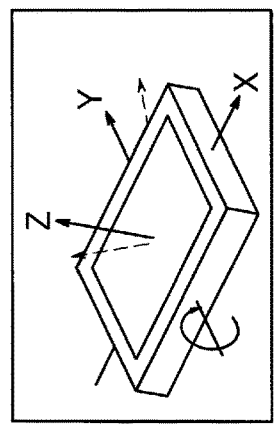

[Fig. 10]
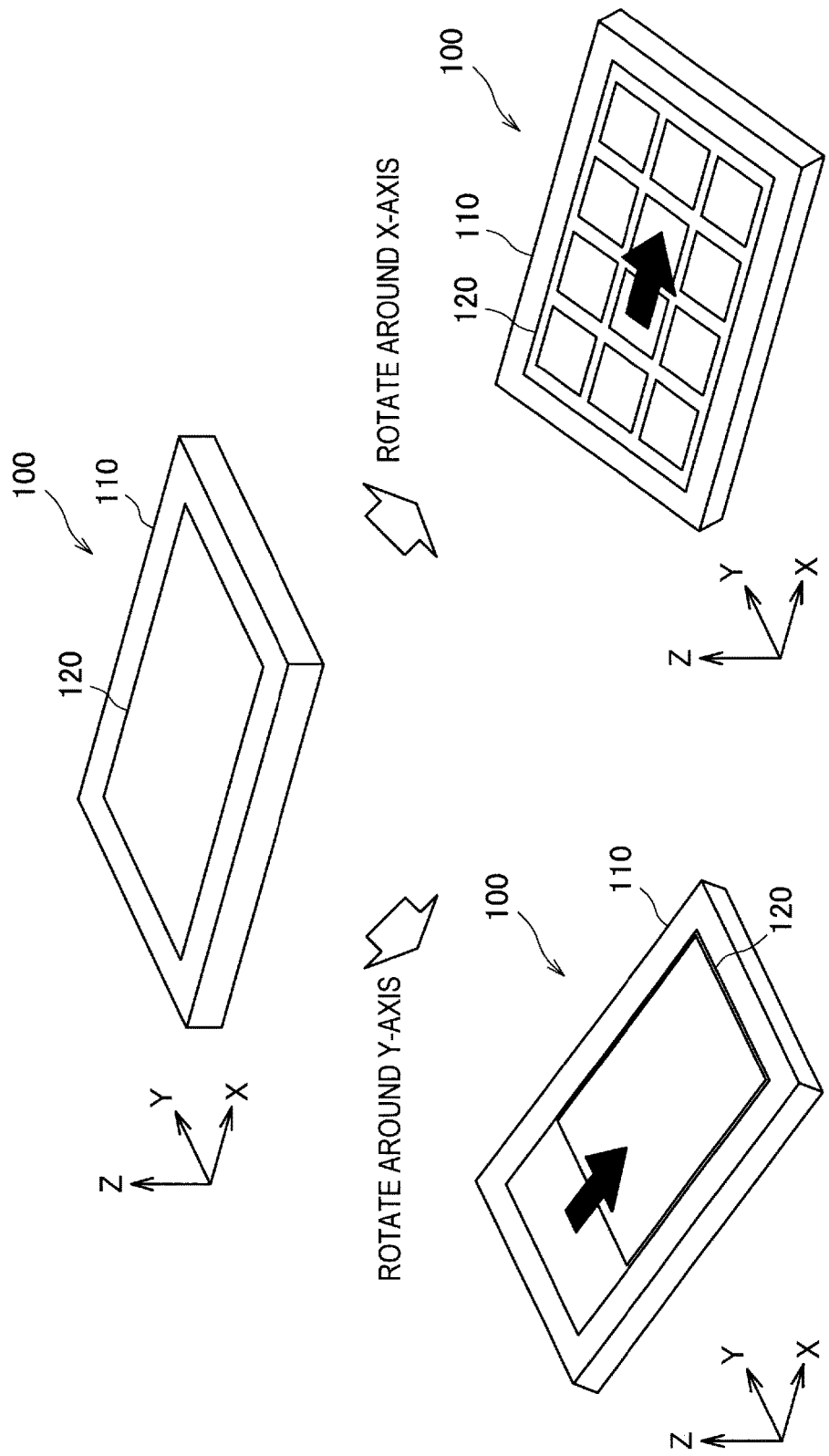

METHOD AND APPARATUS FOR DISPLAYING AND SCROLLING CONTENT

TECHNICAL FIELD

The present disclosure relates to an information processing apparatus, an information processing method, and a computer program.

The present disclosure contains subject matter related to that disclosed in Japanese Priority Patent Application JP 2012-199285 filed in the Japan Patent Office on Sep. 11, 2012, the entire content of which is hereby incorporated by reference.

BACKGROUND ART

Devices having a touch panel, such as a smartphone, a tablet terminal, a digital camera and the like, are becoming more widely spread. When performing an input operation on the touch panel in such a device, the operator can operate the device by touching a screen provided on the touch panel with his/her fingers or by moving his/her fingers while still touching the screen.

Further, although these devices can store content, such as image data, music data, and electronic book data, in a built-in or a removable recording medium, recently, with the development of greater capacity recording media, the number of pieces of content that can be stored in a recording medium has been increasing.

With the increase in the number of pieces of content that can be stored in a recording medium, it takes a longer time to find a desired piece of content. Therefore, there is a need for a technology that makes it easier to find a desired piece of content from among a large number of pieces of content. For example, PTL 1 discloses a technology that changes the scroll speed of stored images based on the tilt of a digital camera.

CITATION LIST

Patent Literature

PTL 1: JP 2010-9575A

SUMMARY

Technical Problem

However, since the technology disclosed in PTL 1 only changes the scroll speed of images stored in a digital camera based on the tilt of the digital camera, when there is a large amount of image data, the images have to be scrolled through until the desired image is found.

Solution to Problem

According to an embodiment of the present disclosure, provided is a novel and improved information processing apparatus, information processing method, and computer program that facilitate the finding of content desired by a user by changing the unit for content scrolling by a user operation based on change in the tilt of a device.

According to an embodiment of the present disclosure, there is provided An information processing device including processing circuitry that implements a first effect in response to a user input when the device is in a first posture and implements a second effect in response to the user input when the device is in a second posture.

According to an embodiment of the present disclosure, there is provided an information processing method that includes implementing with processing circuitry a first effect on displayed content of a device in response to a user input when the apparatus is in a first posture; and implementing with the processing circuitry a second effect in response to the user input when the apparatus is in a second posture.

According to an embodiment of the present disclosure, there is provided a non-transitory computer readable storage medium having computer readable instructions stored therein that when executed by a processor perform an information processing method, the method including implementing with processing circuitry a first effect on displayed content of a device in response to a user input when the apparatus is in a first posture; and implementing with the processing circuitry a second effect in response to the user input when the apparatus is in a second posture

Advantageous Effects of Invention

Thus, according to an embodiment of the present disclosure, by changing a unit for content scrolling by a user operation based on change in the orientation of the device, a novel and improved information processing apparatus, information processing method, and computer program can be provided that facilitate the finding of content desired by the user.

BRIEF DESCRIPTION OF DRAWINGS

FIG. 1 is an explanatory diagram illustrating an appearance example of an imaging apparatus 100 according to an embodiment of the present disclosure as a perspective view from a rear face side of the imaging apparatus 100.

FIG. 2 is an explanatory diagram illustrating a function configuration example of the imaging apparatus 100 according to an embodiment of the present disclosure.

FIG. 3 is an explanatory diagram illustrating a function configuration example of a control unit 110 included in the imaging apparatus 100 according to an embodiment of the present disclosure.

FIG. 4A is an explanatory diagram illustrating an orientation change example of a housing 101 of the imaging apparatus 100.

FIG. 4B is an explanatory diagram illustrating an orientation change example of a housing 101 of the imaging apparatus 100.

FIG. 5 is an explanatory diagram illustrating a function configuration example of the control unit 110 included in the imaging apparatus 100 according to an embodiment of the present disclosure.

FIG. 6 is a flow diagram illustrating an operation example of the imaging apparatus 100 according to an embodiment of the present disclosure.

FIG. 7 is a flow diagram illustrating an operation example of the imaging apparatus 100 according to an embodiment of the present disclosure.

FIG. 8 is an explanatory diagram illustrating a relationship example of a tilt amount from a reference orientation of the housing 101 and a scroll unit for image scrolling during image scrolling processing by the imaging apparatus 100.

FIG. 9A is an explanatory diagram illustrating an example of a screen displayed on a display unit 120 of the imaging apparatus 100 according to an embodiment of the present disclosure.

FIG. 9B is an explanatory diagram illustrating an example of a screen displayed on the display unit 120 of the imaging apparatus 100 according to an embodiment of the present disclosure.

FIG. 9C is an explanatory diagram illustrating an example of a screen displayed on the display unit 120 of the imaging apparatus 100 according to an embodiment of the present disclosure.

FIG. 10 is an explanatory diagram illustrating a control example of the imaging apparatus 100 according to an embodiment of the present disclosure.

DESCRIPTION OF EMBODIMENTS

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

<1. Embodiment of the present disclosure>
(Imaging apparatus appearance example)
(Imaging apparatus function configuration example)
(Control unit function configuration example (1))
(Control unit function configuration example (2))
(Imaging apparatus operation examples)
<2. Conclusion>
<1. Embodiment of the Present Disclosure>
(Imaging Apparatus Appearance Example)

First, as an example of the information processing apparatus according to an embodiment of the present disclosure, an appearance example of the imaging apparatus according to an embodiment of the present disclosure will be described with reference to the drawings. FIG. 1 is an explanatory diagram illustrating an appearance example of an imaging apparatus 100 according to an embodiment of the present disclosure as a perspective view from a rear face side of an imaging apparatus 100. An appearance example of the imaging apparatus 100 according to the embodiment of the present disclosure will now be described with reference to FIG. 1.

As illustrated in FIG. 1, the imaging apparatus 100 according to an embodiment of the present disclosure includes a display unit 120 and an operation unit 130 in a housing 101.

The display unit 120 displays images captured by the imaging apparatus 100, and displays various setting screens of the imaging apparatus 100. A (below described) touch panel is provided on the display unit 120. The user of the imaging apparatus 100 can operate the imaging apparatus 100 by touching the touch panel provided on the display unit 120 with an operation member, such as his/her finger.

The operation unit 130, which lets the user operate the imaging apparatus 100, is configured from buttons and switches for operating the imaging apparatus 100. As the operation unit 130, a zoom button 131, a shutter button 132, and a power button 133 are illustrated in FIG. 1. The zoom button 131 is for changing the magnification during imaging with the imaging apparatus 100. The shutter button 132 is for capturing images with the imaging apparatus 100. The power button 133 is for turning the power of the imaging apparatus 100 ON/OFF.

Needless to say, the appearance of the imaging apparatus 100 is not limited to this example. Further, needless to say, the buttons and switches configuring the operation unit 130 are not limited to those illustrated in FIG. 1.

The imaging apparatus 100 according to an embodiment of the present disclosure changes a scroll unit of images displayed on the display unit 120 during image scrolling processing that is performed by a user operation based on a change in the orientation of the housing 101 by detecting changes in orientation of the housing 101 of the imaging apparatus 100 when an operation is performed on the touch panel provided on the display unit 120. By thus changing the scroll unit of images displayed on the display unit 120 during image scrolling processing by a user operation, the imaging apparatus 100 according to an embodiment of the present disclosure can improve operability when the user performs an operation on the touch panel.

It is noted that in the present embodiment, "image scrolling processing" refers to processing for switching the images displayed on the display unit 120 that is performed when the user of the imaging apparatus 100 operates the imaging apparatus 100. The images displayed on the display unit 120 are, for example, stored in a storage unit 170. Examples of operations for executing image scrolling processing include a drag operation or a flick operation performed on the display unit 120 provided on the touch panel 122.

In the following description, the X-axis, Y-axis, and Z-axis are defined as illustrated in FIG. 1. Namely, the X-axis is the axis along the long side of the display unit 120, the Y-axis is the axis along the short side of the display unit 120, and the Z-axis is the axis orthogonal to the X-axis and the Y-axis.

An appearance example of the imaging apparatus 100 according to an embodiment of the present disclosure was described above with reference to FIG. 1. Next, a function configuration example of the imaging apparatus 100 according to an embodiment of the present disclosure will be described.

(Imaging Apparatus Function Configuration Example)

FIG. 2 is an explanatory diagram illustrating a function configuration example of the imaging apparatus 100 according to an embodiment of the present disclosure. A function configuration example of the imaging apparatus 100 according to an embodiment of the present disclosure will now be described with reference to FIG. 2.

As illustrated in FIG. 2, the imaging apparatus 100 according to an embodiment of the present disclosure includes the control unit 110, the display unit 120, the display unit 120, a flash memory 150, a RAM 160, and a storage unit 170.

The control unit 110 includes control circuitry (e.g., a CPU or distributed CPUs) that controls the operation of the imaging apparatus 100. In the present embodiment, the control unit 110 executes control to change the scroll unit of images displayed on the display unit 120 during image scrolling processing based on a user operation based on the change in the orientation of the housing 101. The control unit 110 can also control the operation of the imaging apparatus 100 by, for example, reading computer programs recorded in the flash memory 150, and sequentially executing the computer programs. A specific configuration example of the control unit 110 will be described in more detail below.

As described above, the display unit 120 displays images captured by the imaging apparatus 100, and displays various setting screens of the imaging apparatus 100. As illustrated in FIG. 2, the display unit 120 includes a display panel 121 and a touch panel 122. The display panel 121 displays images captured by the imaging apparatus 100, and displays various setting screens of the imaging apparatus 100. The display panel 121 is configured from a flat display panel, such as a liquid crystal display panel or an organic EL display panel, for example. The touch panel 122 is provided on the display panel 121. The user can operate the imaging apparatus 100 by touching the touch panel 122 with an operation member, such as his/her finger. Therefore, the control unit 110 executes various processes based on the touch state of the operation member on the touch panel 122.

The operation unit 130, which lets the user operate the imaging apparatus 100, is configured from buttons and switches for operating the imaging apparatus 100. The control unit 110 executes various processes based on the operation state of the operation unit 130. Examples of the various processes that are executed by the control unit 110 based on the operation state of the operation unit 130 include processing for turning the power of the imaging apparatus 100 ON/OFF, processing for changing magnification during imaging as well as other imaging conditions, processing for capturing still images and moving images and the like.

A sensor unit 140 detects a tilt of the housing 101 of the imaging apparatus 100. For the sensor unit 140, an angular velocity sensor or an acceleration sensor may be used, for example. The sensor unit 140 detects a rotation angle of the imaging apparatus 100 in any of a first axis, a second axis, or a third axis. It is noted that it is sufficient for the sensor unit 140 to detect rotation of the imaging apparatus 100 in at least one or more axes.

The flash memory 150 is a non-volatile memory in which the various computer programs that are used for the processing performed by the control unit 110 and various data are stored. Further, the RAM 160 is a working memory that is used during processing by the control unit 110.

It is noted that the control unit 110, the display unit 120, the operation unit 130, the sensor unit 140, the flash memory 150, the RAM 160, and the storage unit 170 are connected to each other via a bus 180, and can communicate with each other.

The storage unit 170 is a storage medium that stores images captured by the imaging apparatus 100. The storage unit 170 may be included in the imaging apparatus 100, or may be a storage medium that can be removed from the imaging apparatus 100. Examples of the storage unit 170 include a flash memory included in the imaging apparatus 100, a storage medium having a flash memory that can be removed from the imaging apparatus 100, a HDD, a SDD (solid state drive), an optical disc and the like.

A function configuration example of the imaging apparatus 100 according to an embodiment of the present disclosure was described above with reference to FIG. 2. Next, a function configuration example of the control unit 110 included in the imaging apparatus 100 according to an embodiment of the present disclosure will be described.

(Control Unit Function Configuration Example (1))

FIG. 3 is an explanatory diagram illustrating a function configuration example of the control unit 110 included in the imaging apparatus 100 according to an embodiment of the present disclosure. A function configuration example of the control unit 110 included in the imaging apparatus 100 according to an embodiment of the present disclosure will be described with reference to FIG. 3.

As illustrated in FIG. 3, the control unit 110 included in the imaging apparatus 100 according to an embodiment of the present disclosure includes an operation detection unit 111, an orientation change detection unit 112, and an operation control unit 113.

The operation detection unit 111 detects for the presence of a user operation on the touch panel 122 or the operation unit 130. If the operation detection unit 111 detects the presence of a user operation on the touch panel 122 or the operation unit 130, processing based on that user operation is executed by the operation control unit 113.

An example will be described in which the operation member, such as the user's finger, touched the touch panel 122. When the operation member, such as the user's finger, approaches or touches the touch panel 122, the touch panel 122 notifies the operation detection unit 111 of the approach detection coordinates, the approach release coordinates, the touch detection coordinates, the touch release coordinates, approach coordinate movement, and touch coordinate movement. If the touch panel 122 is a pressure-sensitive touch panel capable of detecting a pressing force, the touch panel 122 also notifies the operation detection unit 111 of the pressing force of the operation member. Based on the coordinates received from the touch panel 122, the operation detection unit 111 determines whether the operation is a user operation, such as an approach, approach release, touch, touch release, drag, flick, long press, or depress touch, and notifies the operation control unit 113. The operation control unit 113 executes processing based on the information notified from the operation detection unit 111.

A drag operation refers to an operation in which, after touch of the touch panel 122 has been detected, the touch coordinate is moved a predetermined amount or more while touch is maintained. A flick operation refers to an operation in which, after touch of the touch panel 122 has been detected, the touch coordinate is moved while touch is maintained, and then touch of the touch panel 122 is released. A long press operation (hold operation) refers to an operation in which, after touch of the touch panel 122 has been detected, the touch is maintained for a predetermined amount of time or more.

The orientation change detection unit 112 detects changes in orientation of the housing 101 of the imaging apparatus 100. The orientation change detection unit 112 detects changes in orientation of the housing 101 of the imaging apparatus 100 using information regarding the tilt of the housing 101 of the imaging apparatus 100 acquired from the sensor unit 140. For example, if an acceleration sensor is used for the sensor unit 140, the orientation change detection unit 112 acquires a tilt angle of the housing 101 of the imaging apparatus 100 from the acceleration sensor, and stores the acquired tilt angle in the RAM 160. Further, for example, if an angular velocity sensor is used for the sensor unit 140, the orientation change detection unit 112 calculates a rotation angle of the housing 101 of the imaging apparatus 100 by integrating angular velocities acquired from the rotation angular velocity sensor, and stores the calculated rotation angle in the RAM 160.

In the present embodiment, the orientation change detection unit 112 detects that the orientation of the 101 of the imaging apparatus 100 has changed based on information obtained from the sensor unit 140. When the orientation change detection unit 112 detects that the orientation of the 101 of the imaging apparatus 100 has changed, control based on that orientation change is executed by the operation control unit 113.

The operation control unit 113 controls operation of the imaging apparatus 100. The operation control unit 113 controls operation of the imaging apparatus 100 based on a user operation on the touch panel 122 or the operation unit 130 that is detected by the operation detection unit 111.

In the present embodiment, the operation control unit 113 changes the scroll unit of images displayed on the display unit 120 during image scrolling processing that is performed based on a user operation based on the change in the orientation of the housing 101 of the imaging apparatus 100 detected by the orientation change detection unit 112. By executing control to change the scroll unit of the images displayed on the display unit 120 by a user operation with the operation control unit 113, the imaging apparatus 100 according to an embodiment of the present disclosure can facilitate the finding of a desired image.

FIGS. 4A and 4B are explanatory diagrams illustrating an orientation change example of the housing 101 of the imaging apparatus 100. In FIGS. 4A and 4B, to facilitate the description, only the display unit 120 provided in the housing 101 is illustrated. FIGS. 4A and 4B illustrate a state in which the display unit 120 has been rotated by an angle theta around the Y-axis. The orientation change detection unit 112 detects such a change in the orientation of the housing 101 of the imaging apparatus 100. Then, the operation control unit 113 executes control to change the scroll unit for content displayed on the display unit 120 based on the change in the orientation of the housing 101 of the imaging apparatus 100.

An outline of changes to the scroll unit of images displayed on the display unit 120 during image scrolling processing that is performed based on a user operation by the imaging apparatus 100 according to an embodiment of the present disclosure was described above. In the description up to this point, the orientation change detection unit 112 detected changes in orientation of the housing 101 of the imaging apparatus 100, and the operation control unit 113 executed control to change the scroll unit of content based on the change in the orientation of the housing 101 of the imaging apparatus 100. While the orientation change detection unit 112 is detecting changes in the orientation of the housing 101 of the imaging apparatus 100, the orientation change detection unit 112 can also detect that the orientation has changed from a predetermined reference orientation. In the following, a case will be described in which the orientation change detection unit 112 detects changes in orientation from a predetermined reference orientation, and the operation control unit 113 executes control to change the scroll unit of content based on the change in orientation from a reference orientation of the housing 101 of the imaging apparatus 100.

(Control Unit Function Configuration Example (2))

FIG. 5 is an explanatory diagram illustrating a function configuration example of the control unit 110 included in the imaging apparatus 100 according to an embodiment of the present disclosure. A function configuration example of the control unit 110 included in the imaging apparatus 100 according to an embodiment of the present disclosure will now be described with reference to FIG. 5.

As illustrated in FIG. 5, the control unit 110 included in the imaging apparatus 100 according to an embodiment of the present disclosure includes the operation detection unit 111, the orientation change detection unit 112, the operation control unit 113, and a reference orientation setting unit 114. Namely, the control unit 110 illustrated in FIG. 5 adds the reference orientation setting unit 114 to the control unit 110 illustrated in FIG. 3.

The reference orientation setting unit 114 sets a reference orientation of the housing 101 of the imaging apparatus 100 in order for the orientation change detection unit 112 to detect changes in orientation of the housing 101 of the imaging apparatus 100 from a predetermined reference orientation. The reference orientation setting unit 114 can employ various methods to set the reference orientation of the housing 101 of the imaging apparatus 100. For example, the reference orientation setting unit 114 may set the orientation of the housing 101 of the imaging apparatus 100 at the point when the operation detection unit 111 detected that the operation member touched or approached the touch panel 122 as the reference orientation. Further, for example, the reference orientation setting unit 114 may set the orientation of the housing 101 of the imaging apparatus 100 at the point when the operation detection unit 111 detected that an operation was made on the operation unit 130 as the reference orientation. In addition, for example, the reference orientation setting unit 114 may set the orientation of the housing 101 of the imaging apparatus 100 at the point when the operation detection unit 111 has not detected an operation on the operation unit 130 for a predetermined period as the reference orientation. Still further, for example, the reference orientation setting unit 114 may set the orientation of the housing 101 of the imaging apparatus 100 at the point when the operation detection unit 111 detected an operation other than a touch or an approach to the touch panel 122 as the reference orientation. Still even further, for example, the reference orientation setting unit 114 may set the orientation of the housing 101 of the imaging apparatus 100 at the point when processing to view images stored in the storage unit 170 of the imaging apparatus 100 was executed by the user as the reference orientation.

By setting the reference orientation of the housing 101 of the imaging apparatus 100 with the reference orientation setting unit 114, the orientation change detection unit 112 can detect whether the housing 101 of the imaging apparatus 100 has changed from the reference orientation based on information from the sensor unit 140. Further, by setting the reference orientation of the housing 101, the imaging apparatus 100 can execute control to change the unit for image scrolling during image scrolling based on the change from the reference orientation.

For example, if an acceleration sensor is used for the sensor unit 140, the reference orientation setting unit 114 acquires a tilt angle of the housing 101 of the imaging apparatus 100 from the acceleration sensor, and stores that tilt angle in the RAM 160 as a reference. The orientation change detection unit 112 can detect whether the housing 101 of the imaging apparatus 100 has changed from the reference orientation by determining whether the housing 101 of the imaging apparatus 100 has changed from the reference angle based on information from the sensor unit 140. Further, for example, if an angular velocity sensor is used for the sensor unit 140, the reference orientation setting unit 114 initializes an integral value of an angular velocity acquired from the angular velocity sensor to zero. The orientation change detection unit 112 can detect whether the housing 101 of the imaging apparatus 100 has changed from the reference orientation by integrating angular velocities acquired from the rotation angular velocity sensor, and calculating the rotation angle of the housing 101 of the imaging apparatus 100.

A function configuration example of the control unit 110 included in the imaging apparatus 100 according to an embodiment of the present disclosure was described above with reference to FIG. 5. Next, an operation example of the imaging apparatus 100 according to an embodiment of the present disclosure will be described.

(Imaging Apparatus Operation Examples)

FIG. 6 is a flow diagram illustrating an operation example of the imaging apparatus 100 according to an embodiment of the present disclosure. The flow illustrated in FIG. 6 illustrates an operation example of the imaging apparatus 100 when executing image scrolling processing that is performed based on a user operation. An operation example of the imaging apparatus 100 according to an embodiment of the present disclosure will now be described with reference to FIG. 6.

First, in a state in which image scrolling processing can be performed, when a slide operation (a drag operation or a flick operation) on the display unit 120 by the user is detected by the operation detection unit 111 (step S101), the imaging apparatus 100 controls with the operation control unit 113 so that the image scrolling processing is executed based on the slide operation detected by the operation detection unit 111 (step S102).

After controlling in step S102 with the operation control unit 113 so that the image scrolling processing is executed, the imaging apparatus 100 sets orientation with the reference orientation setting unit 114 the orientation of the imaging apparatus 100 at the point when the image scrolling processing was executed under the control of the operation control unit 113 as the reference orientation (step S103).

After the imaging apparatus 100 sets in step S103 with the reference orientation setting unit 114 the orientation of the imaging apparatus 100 at the point when the image scrolling processing was executed as the reference orientation, next, the imaging apparatus 100 determines with the operation detection unit 111 whether the touch on the display unit 120 by the user is being maintained (step S104). Here, the determination regarding whether the touch on the display unit 120 by the user is being maintained can be performed based on whether the user has been continuously touching the display unit 120. However, in a drag operation (or a flick operation) on the display unit 120, the user does not continuously touch the display unit 120 at all times, a state in which the user releases his/her touch of the display unit 120 may exist. Therefore, the operation detection unit 111 may determine that the touch by the user on the display unit 120 is being maintained if the time from a release until the next touch is within a predetermined threshold.

If it is determined by the operation detection unit 111 in step S104 that the touch on the display unit 120 by the user is being maintained, the imaging apparatus 100 then monitors changes in the tilt of the housing 101 by detecting with the orientation change detection unit 112 (step S105).

After monitoring the changes in the tilt of the housing 101 from the reference orientation in step S105 by detecting with the orientation change detection unit 112, the imaging apparatus 100 then determines with the operation control unit 113 the image scroll unit and scroll direction during image scrolling processing based on the tilt amount of the housing 101 from the reference orientation (step S106).

After determining in step S105 with the operation control unit 113 the scroll unit and scroll direction during image scrolling processing, the imaging apparatus 100 controls with the operation control unit 113 so that image scrolling processing is executed based on the drag operation (or flick operation) made by the user on the display unit 120 (step S107).

Next, the imaging apparatus 100 determines with the operation detection unit 111 whether the touch on the display unit 120 by the user has been released (step S108). For example, if the next touch after a touch release is not detected even after a predetermined threshold, the operation detection unit 111 can determine that the touch on the display unit 120 by the user has been released.

If it is determined by the operation detection unit 111 in step S108 that the touch on the display unit 120 by the user has not been released, the imaging apparatus 100 returns to the processing for monitoring changes in the tilt of the housing 101 performed in the above step S105.

On the other hand, if it is determined in step S104 or step S108 by the operation detection unit 111 that the touch on the display unit 120 by the user has been released, the imaging apparatus 100 finishes the image scrolling processing.

Thus, by setting the orientation of the housing 101 at the point when the user started image scrolling processing as a reference orientation, and monitoring changes from that reference orientation, the imaging apparatus 100 according to an embodiment of the present disclosure can determine an image scroll unit and scroll direction during image scrolling processing based on the amount of change from the reference orientation. Further, by determining the image scroll unit and scroll direction during image scrolling processing based on the amount of change from the reference orientation with the imaging apparatus 100, the user can more easily find a desired image among the images stored in the imaging apparatus 100.

Here, the processing performed in steps S105 and S106 in the flow illustrated in FIG. 6 will now be described in more detail.

FIG. 7 is a flow diagram illustrating an operation example of the imaging apparatus 100 according to an embodiment of the present disclosure. The flow illustrated in FIG. 7 illustrates an operation example of the imaging apparatus 100 when executing image scrolling processing based on a user operation, which illustrates the processing performed in steps S105 and S106 in the flow illustrated in FIG. 6 in more detail. An operation example of the imaging apparatus 100 according to an embodiment of the present disclosure will now be described with reference to FIG. 7.

The imaging apparatus 100 detects with the orientation change detection unit 112 which direction the housing 101 has tilted from the reference orientation during the monitoring by detecting with the orientation change detection unit 112 changes in the tilt of the housing 101 (step S111). In the present embodiment, tilting of the housing 101 like in FIG. 4A is defined as a tilt in the negative direction, and tilting of the housing 101 like in FIG. 4B is defined as a tilt in the positive direction. Obviously, the definitions of the tilt direction from the reference orientation of the housing 101 are not limited to those given in this example.

If it is detected in step S111 that the tilt direction is the negative direction, the imaging apparatus 100 controls with the operation control unit 113 so that the scroll direction during image scrolling processing is set to a "−" direction, namely, is a reverse scroll (step S112).

After controlling the operation control unit 113 in step S112 so that the scroll direction during image scrolling processing is set to a "−" direction, next, the imaging apparatus 100 determines with the orientation change detection unit 112 whether the tilt amount from the reference orientation of the housing 101 is equal to or greater than a predetermined amount (step S113).

If it is determined in step S113 that the tilt amount from the reference orientation of the housing 101 is equal to or greater than a predetermined amount, the imaging apparatus 100 controls the operation control unit 113 so that the unit for image scrolling during image scrolling processing is in units of years (step S114). On the other hand, if it is determined in step S113 that the tilt amount from the reference orientation of the housing 101 is not equal to or greater than a predetermined amount, the imaging apparatus 100 controls the operation control unit 113 so that the unit for image scrolling during image scrolling processing is in units of days (step S115).

If it is detected in step S111 that the tilt direction is the positive direction, the imaging apparatus 100 controls with the operation control unit 113 so that the scroll direction during image scrolling processing is set to a "+" direction, namely, is a forward scroll (step S116).

After controlling the operation control unit 113 in step S116 so that the scroll direction during image scrolling processing is set to a "+" direction, next, the imaging apparatus 100 determines with the orientation change detection unit 112 whether the tilt amount from the reference orientation of the housing 101 is equal to or greater than a predetermined amount (step S117).

If it is determined in step S117 that the tilt amount from the reference orientation of the housing 101 is equal to or greater than a predetermined amount, the imaging apparatus 100 controls the operation control unit 113 so that the unit for image scrolling during image scrolling processing is in units of years (step S119). On the other hand, if it is determined in step S117 that the tilt amount from the reference orientation of the housing 101 is not equal to or greater than a predetermined amount, the imaging apparatus 100 controls the operation control unit 113 so that the unit for image scrolling during image scrolling processing is in units of days (step S119).

Note that if it is detected in step S111 that there is no tilt from the reference orientation, the imaging apparatus 100 controls with the operation control unit 113 so that the unit for image scrolling during image scrolling processing is set to a unit of one image (step S120).

As illustrated in FIG. 7, the imaging apparatus 100 according to an embodiment of the present disclosure can determine the direction and unit for image scrolling during image scrolling processing based on the tilt direction from the reference orientation of the housing 101 and the tilt amount from the reference orientation.

It is noted that in the flow diagram illustrated in FIG. 7, although the scroll unit for image scrolling during the image scrolling processing by the imaging apparatus 100 is selected from among units of one image, days, and years, the present disclosure is not limited to this example. Further, when the scroll unit for image scrolling during the image scrolling processing by the imaging apparatus 100 is thus selected from among units of one image, days, and years, if there are no images that were captured on the date corresponding to the scroll destination, the imaging apparatus 100 may display an image that was captured at a date near to that on the display unit 120. In addition, when the scroll unit for image scrolling during the image scrolling processing by the imaging apparatus 100 is selected from among units of days or years, the imaging apparatus 100 may also display the image that was captured first on that day or in that year on the display unit 120. While the present description has been made in reference to a scrolling operation, the embodiment also includes a page flipping operation, a page forwarding operation (sliding one page out of the way for another), a flashing operation (substituting one page for a next page), seeking time operation (time that a screen prompt moves in response to a movement of a user interaction), progress bar and time scale, for example.

FIG. 8 is an explanatory diagram illustrating a relationship example of a tilt amount from the reference orientation of the housing 101 and a scroll unit for image scrolling during image scrolling processing by the imaging apparatus 100. The imaging apparatus 100 according to an embodiment of the present disclosure can also associate the tilt amount from the reference orientation of the housing 101 and the unit for image scrolling during image scrolling processing by the imaging apparatus 100 as illustrated in FIG. 8 when executing the image scrolling processing with the operation control unit 113. Namely, the imaging apparatus 100 according to an embodiment of the present disclosure can, when executing the image scrolling processing with the operation control unit 113, increase the unit for image scrolling during the image scrolling processing by the imaging apparatus 100 in units of days->weeks->months->years the greater the tilt amount from the reference orientation of the housing 101 is.

Thus, the imaging apparatus 100 according to an embodiment of the present disclosure can determine the direction and unit for image scrolling during image scrolling processing based on the tilt direction from the reference orientation of the housing 101 and the tilt amount from the reference orientation. However, based only on an association between the tilt amount from the reference orientation and the scroll unit for image scrolling during image scrolling processing by the imaging apparatus 100, the user of the imaging apparatus 100 may not know what scroll unit the current tilt corresponds to.

Accordingly, the imaging apparatus 100 according to an embodiment of the present disclosure may also display on the display unit 120 what unit the tilt amount from the reference orientation of the housing 101 corresponds to.

FIGS. 9A to 9C are explanatory diagrams illustrating examples of a screen displayed on the display unit 120 of the imaging apparatus 100 according to an embodiment of the present disclosure. What is illustrated in FIGS. 9A to 9C are display examples of the unit for image scrolling during image scrolling processing on the display unit 120 that correspond to the tilt amount from the reference orientation of the housing 101.

FIG. 9A illustrates an example of the screen displayed on the display unit 120 when the housing 101 is in a non-tilted state from the reference orientation. When the housing 101 is in a non-tilted state from the reference orientation, a triangular mark 201 indicating the tilt direction and the tilt amount from the reference orientation of the housing 101 is controlled by the operation control unit 113 so as to point to a position indicating a unit of one image, which is in the center of the scale, for example.

FIG. 9B illustrates an example of the screen displayed on the display unit 120 when the housing 101 is tilted in the negative direction from the reference orientation. When the housing 101 is tilted in the negative direction from the reference orientation, the triangular mark 201 indicating the tilt direction and the tilt amount from the reference orientation of the housing 101 is controlled by the operation control unit 113 so as to point to a position corresponding to the tilt amount from the reference orientation of the housing 101, which is to the left of the center of the scale, for example.

FIG. 9C illustrates an example of the screen displayed on the display unit 120 when the housing 101 is tilted in the positive direction from the reference orientation. When the housing 101 is tilted in the positive direction from the reference orientation, the triangular mark 201 indicating the tilt direction and the tilt amount from the reference orientation of the housing 101 is controlled by the operation control unit 113 so as to point to a position corresponding to the tilt amount from the reference orientation of the housing 101, which is to the right of the center of the scale, for example.

Thus, by configuring so that the imaging apparatus 100 according to an embodiment of the present disclosure displays on the display unit 120 which scroll unit for image scrolling processing the tilt amount from the reference orientation of the housing 101 corresponds to, the user of the imaging apparatus 100 can visually know which scroll unit the current tilt corresponds to.

Operation examples of the imaging apparatus 100 according to an embodiment of the present disclosure were described above with reference to the drawings. Obviously, the user operations controlled by the imaging apparatus 100 according to an embodiment of the present disclosure are not limited to these examples. For instance, the imaging apparatus 100 according to an embodiment of the present disclosure may also change the threshold for a pinch operation (drawing the fingers closer and then moving them further away) performed using two fingers based on the change in orientation of the housing 101. The pinch operation changes a zoom amount of a displayed image.

In addition, when a reference orientation has been set by the reference orientation setting unit 114, the imaging apparatus 100 according to an embodiment of the present disclosure can also make the reference orientation setting unit 114 release the reference orientation setting if the fact that the user touched a certain specific button on the operation unit 130 is detected by the operation detection unit 111. Still further, when a reference orientation has been set by the reference orientation setting unit 114, the imaging apparatus 100 according to an embodiment of the present disclosure can also make the reference orientation setting unit 114 release the reference orientation setting if the fact that the user has made a specific gesture toward the touch panel 122 is detected by the operation detection unit 111. Still even further, for example, the imaging apparatus 100 according to an embodiment of the present disclosure can also make the reference orientation setting unit 114 release the reference orientation setting at the point when the processing for viewing the images stored in the storage unit 170 of the imaging apparatus 100 has been finished by the user.

Accordingly, the imaging apparatus 100 according to an embodiment of the present disclosure can release the reference orientation temporarily set by the reference orientation setting unit 114 based on what the user operation is. By releasing the reference orientation temporarily set by the reference orientation setting unit 114 based on what the user operation is, the imaging apparatus 100 according to an embodiment of the present disclosure can avoid a deterioration in operability resulting from the unintended setting by the user of a reference orientation.

<2. Conclusion>

Thus, the imaging apparatus 100 according to an embodiment of the present disclosure can change the unit for image scrolling during image scrolling processing that is executed based on a user operation based on a change in the orientation of the housing 101. Further, the imaging apparatus 100 according to an embodiment of the present disclosure can set the orientation of the housing 101 at a predetermined point (e.g., a point when image scrolling processing started) as the reference orientation, and change the direction and unit for image scrolling during image scrolling processing based on the tilt direction and amount of change in tilt from that reference orientation.

Further, the imaging apparatus 100 according to an embodiment of the present disclosure displays on the display unit 120 which scroll unit for image scrolling processing the tilt amount from the reference orientation of the housing 101 corresponds to. Consequently, the user of the imaging apparatus 100 can visually know which scroll unit the current tilt corresponds to.

Further, in the embodiment of the present disclosure described above, although the imaging apparatus 100 was described as an example of the information processing apparatus according to an embodiment of the present disclosure, needless to say the information processing apparatus according to an embodiment of the present disclosure is not limited to an imaging apparatus. For example, the present technology can also be applied to a personal computer, a tablet terminal, a mobile telephone, a smartphone, a portable music player, a portable television receiver and the like.

The respective steps in the processing executed by the various apparatuses described in the present disclosure do not have to be performed in chronological order according to the order described as a sequence diagram or flowchart. For example, the respective steps in the processing executed by the various apparatuses can be carried out in a different order to that described in the flowcharts, or can be carried out in parallel.

In addition, a computer program can be created that makes hardware, such as a CPU, ROM, and RAM, in the various apparatuses realize functions equivalent to the parts of the various above-described apparatuses. Still further, a storage medium on which such a computer program is stored can also be provided. Moreover, series of processes can also be realized by hardware by configuring the respective function blocks illustrated in the function block diagrams as hardware.

It should be understood by those skilled in the art that various modifications, combinations, sub-combinations and alterations may occur depending on design requirements and other factors insofar as they are within the scope of the appended claims or the equivalents thereof.

For example, in the embodiment of the present disclosure described above, although image scrolling processing was described for when the images stored in the storage unit 170 of the imaging apparatus 100 are displayed on the display unit 120, the present disclosure is not limited to this example. For example, the same processing can be applied even for image scrolling processing performed when images stored in a server apparatus or the like on a network are displayed on the display unit 120.

Further, for example, although the scroll direction and the scroll unit during image scrolling processing were determined based on whether the housing 101 of the imaging apparatus 100 is tilted in a positive direction or a negative direction around the Y-axis, the present disclosure is not limited to this example. For example, the operation control unit 113 may also control so that the number of images displayed on the display unit 120 is changed based on the direction of change in the tilt of the housing 101 of the imaging apparatus 100, and the image scrolling processing for switching the display of the images is executed based on a user slide operation detected by the operation detection unit 111.

FIG. 10 is an explanatory diagram illustrating a control example of the imaging apparatus 100 according to an embodiment of the present disclosure. As illustrated in FIG. 10, the operation control unit 113 can also control so that when the housing 101 of the imaging apparatus 100 has been tilted around the Y-axis, scrolling processing is executed in units of one image, and when the housing 101 of the imaging apparatus 100 has been tilted around the X-axis, scrolling processing is executed by displaying a plurality of thumbnail images on the display unit 120 and performing the scrolling processing based on those plurality of thumbnail images.

Further, in the above description, although the scroll unit during image scrolling processing was changed in units of single images, days, and years based on the amount of change in the orientation of the housing 101 of the imaging apparatus 100, the present disclosure is not limited to this example. For example, the number of scrolled images during image scrolling processing can be changed based on the amount of change in the orientation of the housing 101 of the imaging apparatus 100 in units such as single images, 10 images, 100 images and the like.

Additionally, the present technology may also be configured as below.

(1)

An information processing device including processing circuitry that implements a first effect in response to a user input when the device is in a first posture and implements a second effect in response to the user input when the device is in a second posture.

(2) The information processing device of (1), wherein the first effect and the second effect are different effects of a common display function.

(3) The information processing device of (2), wherein the second effect has a larger effect on a displayed content than the first effect.

(4) The information processing device of (1), wherein the display function includes at least one of a scrolling operation, a flipping operation, a page forwarding operation, a flashing operation, seeking time operation, a progress bar operation, and a time scale of displayed content operation.

(5) The information processing device of (2), wherein an amount of difference of effect is related to an amount of difference between the first posture and the second posture.

(6) The information processing device of (2), wherein the common display function is a scrolling function, the first effect is a scrolling of displayed content in a first direction when the first posture is a tilt in a negative direction, and the second effect is a scrolling of displayed content in a second direction when the second posture is a tilt in a positive direction, wherein the first direction is opposite to the second direction.

(7) The information processing device of (1), wherein the common display function is a scrolling function, and the processing circuitry is configured to cause a display device to display a scroll amount indicator that illustrates an amount of tilt of the apparatus and a corresponding scroll amount associated with the amount of tilt.

(8) The information processing device of (7), wherein the scroll amount indicator also includes a direction of tilt of the apparatus.

(9) The information processing device of (1), wherein the user input is a pinch operation, and the common display function changes a zoom amount of a displayed image.

(10) The information processing device of (1), wherein the processing circuitry is configured to set a reference orientation setting of the apparatus in response to receiving another user input.

(11) The information processing device of (10), wherein the processing circuitry is configured to release the reference orientation setting in response to a detected gesture made by the user.

(12) The information processing device of (1), further including an orientation change detector that detects an orientation posture of the apparatus.

(13) The information processing device of (1), further including a user interface through with the user input is made.

(14) An information processing method including implementing with processing circuitry a first effect on displayed content of a device in response to a user input when the apparatus is in a first posture; and implementing with the processing circuitry a second effect in response to the user input when the apparatus is in a second posture.

(15) The information processing method of (14), wherein the first effect and the second effect are different effects of a common display function.

(16) The information processing method of (15), wherein the second effect has a larger effect on a displayed content than the first effect.

(17) The information processing method of (14), wherein the display function includes at least one of a scrolling operation, a flipping operation, a page forwarding operation, a flashing operation, seeking time operation, a progress bar operation, and a time scale of displayed content operation.

(18) The information processing method of (15), wherein an amount of difference of effect is related to an amount of difference between the first posture and the second posture.

(19) The information processing method of (15), wherein the common display function is a scrolling function, the first effect is a scrolling of displayed content in a first direction when the first posture is a tilt in a negative direction, and the second effect is a scrolling of displayed content in a second direction when the second posture is a tilt in a positive direction, wherein the first direction is opposite to the second direction.

(20) A non-transitory computer readable storage medium having computer readable instructions stored therein that when executed by a processor perform an information processing method, the method including implementing with processing circuitry a first effect on displayed content of a device in response to a user input when the apparatus is in a first posture; and implementing with the processing circuitry a second effect in response to the user input when the apparatus is in a second posture.

(21) An information processing apparatus including:

an operation detection unit configured to detect a user operation;

an orientation change detection unit configured to detect a change in an orientation of a housing; and an operation control unit configured to change a switch unit of content whose display is switched based on a predetermined user operation detected by the operation detection unit based on the change in the orientation of the housing detected by the orientation change detection unit.

(22) The information processing apparatus according to (21), further including:

a reference orientation setting unit configured to set a reference orientation of the housing, wherein the operation control unit is configured to change the switch unit of content when the orientation change detection unit detects that the orientation of the housing has changed from the reference orientation of the housing set by the reference orientation setting unit.

(23) The information processing apparatus according to (21) or (22), wherein the operation control unit is configured to change the switch unit of content based on an amount of the change in the orientation of the housing detected by the orientation change detection unit.

(24) The information processing apparatus according to any one of (21) to (23), further including:
a display unit configured to display content,
wherein the operation control unit is configured to switch a content display based on a slide operation on the display unit detected by the operation detection unit.

(25) The information processing apparatus according to any one of (21) to (24), further including:
a display unit configured to display content,
wherein the operation control unit is configured to display on the display unit information regarding the switch unit that changes based on the change in the orientation of the housing detected by the orientation change detection unit.

(26) The information processing apparatus according to (25), wherein the operation control unit is configured to display on the display unit information regarding the switch unit while tracking the change in the orientation of the housing detected by the orientation change detection unit.

(27) The information processing apparatus according to any one of (21) to (25), further including:
a display unit configured to display content,
wherein the operation control unit is configured to change a number of pieces of content to be displayed on the display unit based on a direction of the change of the housing detected by the orientation change detection unit, and then switch the content display based on the predetermined user operation detected by the operation detection unit.

(28) An information processing method including:
detecting a user operation;
detecting a change in an orientation of a housing; and
changing a switch unit of content whose display is switched based on a predetermined user operation detected in the operation detection step based on the change in the orientation of the housing detected in the orientation change detection step.

(29) A computer program for causing a computer to execute:
detecting a user operation;
detecting a change in an orientation of a housing; and
changing a switch unit of content whose display is switched based on a predetermined user operation detected in the operation detection step based on the change in the orientation of the housing detected in the orientation change detection step.

REFERENCE SIGNS LIST

100 Imaging apparatus
101 Housing
110 Control unit
111 Operation detection unit
112 Orientation change detection unit
113 Operation control unit
114 Reference orientation setting unit
120 Display unit
130 Operation unit
140 Sensor unit
150 Flash memory
160 RAM
170 Storage unit

The invention claimed is:
1. An information processing device, comprising:
a display screen configured to display a plurality of contents; and
circuitry configured to:
set a reference orientation of the information processing device;
scroll, based on a first scroll unit of time and a first direction of scroll, the plurality of contents;
receive a first user input;
determine a new orientation of the information processing device based on the received first user input;
compare the new orientation with the reference orientation;
detect a change in orientation of the information processing device based on the comparison of the new orientation with the reference orientation;
determine a second scroll unit of time and a second direction of scroll based on the detected change in orientation,
wherein the second scroll unit of time accommodates first content items of the plurality of contents, and
wherein the first content items correspond to a specific time interval;
scroll the plurality of contents based on the determined second scroll unit of time and the second direction of scroll;
determine a threshold value associated with a pinch operation based on the detected change in orientation, wherein the pinch operation corresponds to a second user input on the display screen; and
control the display screen to modify the displayed plurality of contents based on the determined threshold value associated with the pinch operation that corresponds to the second user input.

2. The information processing device of claim 1, wherein the first scroll unit of time is larger than the second scroll unit of time.

3. The information processing device of claim 1, wherein the second scroll unit of time is larger than the first scroll unit of time.

4. The information processing device of claim 1, wherein an amount of difference between the first scroll unit of time and the second scroll unit of time is based on a magnitude of the detected change in orientation of the information processing device.

5. The information processing device of claim 1, wherein the first user input is an operation to tilt the information processing device, and
the circuitry is further configured to:
detect each of a magnitude of the tilt and a first direction of the tilt;
determine the second scroll unit of time based on the detected magnitude of the tilt; and
determine the second direction of scroll of the plurality of contents based on the detected first direction of the tilt.

6. The information processing device of claim 5, wherein the circuitry is further configured to control the display device to display a scroll amount indicator that indicates the magnitude of the tilt and a corresponding scroll amount associated with the magnitude of the tilt.

7. The information processing device of claim 6, wherein the scroll amount indicator also indicates the first direction of the tilt.

8. The information processing device of claim 1, wherein the circuitry is further configured to set the reference orientation setting of the information processing device based on a second user input.

9. The information processing device of claim 8, wherein the circuitry is further configured to release the reference orientation setting based on detection of a user gesture.

10. The information processing device of claim 1, further comprising an orientation change detector configured to detect a posture of the information processing device.

11. The information processing device of claim 1, wherein the first scroll unit of time corresponds to a single page of content displayed on the display device,
wherein the displayed single page of content accommodates one of the plurality of contents, and
wherein each of the plurality of contents comprises at least one content item.

12. The information processing device of claim 1, wherein the second scroll unit of time corresponds to a unit of a day, wherein the second scroll unit of time accommodates second content items of the plurality of contents, and wherein the second content items correspond to the day.

13. The information processing device of claim 1, wherein the second scroll unit of time corresponds to a unit of a year, wherein the second scroll unit of time accommodates third content items of the plurality of contents, and wherein the third content items correspond to the year.

14. The information processing device of claim 1, wherein the pinch operation comprises a zoom operation that changes a zoom amount of the displayed plurality of contents based on the second user input.

15. An information processing method, comprising:
in an information processing device:
setting a reference orientation of the information processing device;
scrolling, based on a first scroll unit of time and a first direction of scroll, a plurality of contents,
wherein the plurality of contents are displayed on a display device;
receiving a user input;
determining a new orientation of the information processing device based on the received user input;
comparing the new orientation with the reference orientation;
detecting a change in orientation of the information processing device based on the comparison of the new orientation with the reference orientation;
determining a second scroll unit of time and a second direction of scroll based on the detected change in orientation,
wherein the second scroll unit of time accommodates first content items of the plurality of contents, and
wherein the first content items correspond to a specific time interval;
scrolling the plurality of contents based on the determined second scroll unit of time and the second direction of scroll;
determining a threshold value associated with a pinch operation based on the detected change in orientation, wherein the pinch operation corresponds to a second user input on the display device; and
controlling the display device to modify the displayed plurality of contents based on the determined threshold value associated with the pinch operation that corresponds to the second user input.

16. The information processing method of claim 15, wherein the first scroll unit of time is larger than the second scroll unit of time.

17. The information processing method of claim 15, wherein the second scroll unit of time is larger than the first scroll unit of time.

18. The information processing method of claim 15, wherein an amount of difference between the first scroll unit of time and the second scroll unit of time is based on a magnitude of the detected change in orientation of the information processing device.

19. The information processing method of claim 16,
wherein the user input corresponds to an operation to tilt the information processing device, and
wherein the information processing method further comprising:
detecting each of a magnitude of the tilt and a first direction of the tilt;
determining the second scroll unit of time based on the detected magnitude of the tilt; and
determining the second direction of scroll of the plurality of contents based on the detected first direction of the tilt.

20. A non-transitory computer-readable medium having stored thereon, computer readable instructions for causing an information processing device to execute operations, the operations comprising:
setting a reference orientation of the information processing device;
scrolling, based on a first scroll unit of time and a first direction of scroll, a plurality of contents,
wherein the plurality of contents are displayed on a display device;
receiving a user input;
determining a new orientation of the information processing device based on the received user input;
comparing the new orientation with the reference orientation;
detecting a change in orientation of the information processing device based on the comparison of the new orientation with the reference orientation;
determining a second scroll unit of time and a second direction of scroll based on the detected change in orientation,
wherein the second scroll unit of time accommodates first content items of the plurality of contents, and
wherein the first content items correspond to a specific time interval;
scrolling the plurality of contents based on the determined second scroll unit of time and the second direction of scroll;
determining a threshold value associated with a pinch operation based on the detected change in orientation, wherein the pinch operation corresponds to a second user input on the display device; and
controlling the display device to modify the displayed plurality of contents based on the determined threshold value associated with the pinch operation that corresponds to the second user input.

* * * * *